June 7, 1949.   J. A. SAFFIR   2,472,492
CAST OR MOLDED DENTURE
Filed Jan. 30, 1945
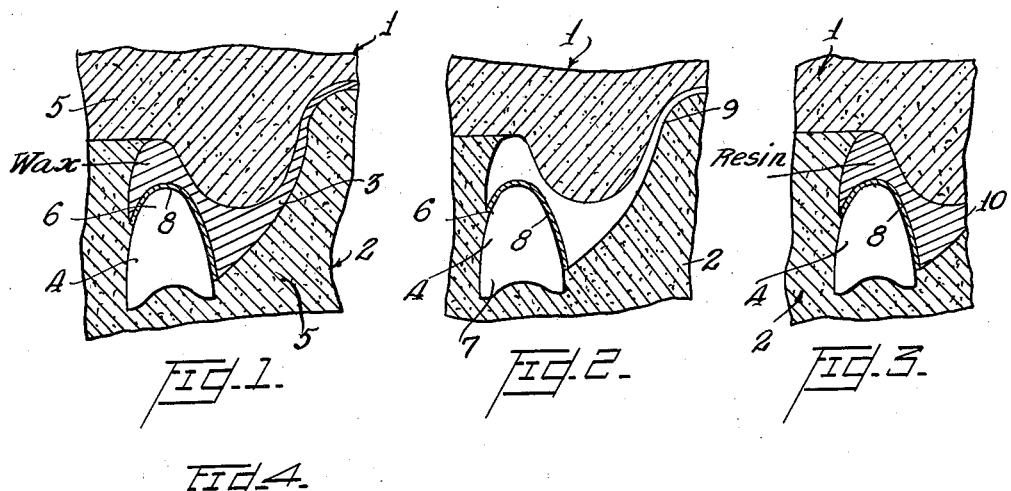
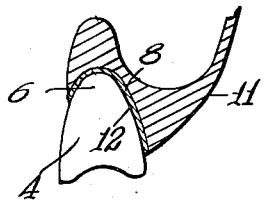
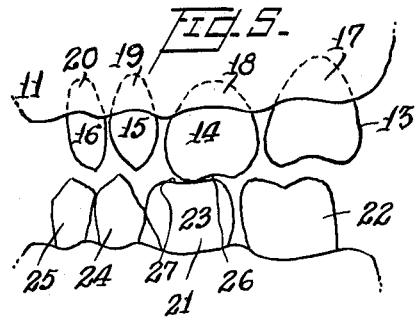
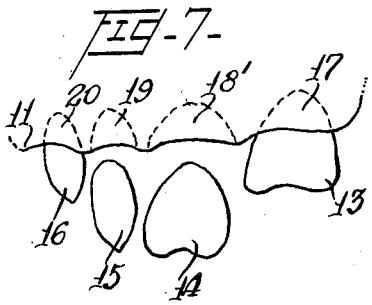
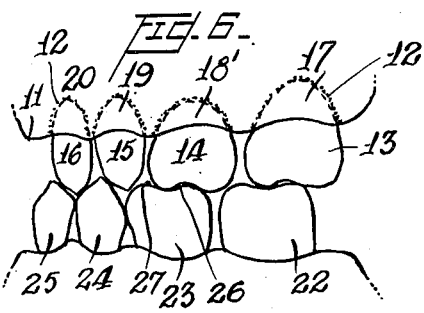
Inventor
Jacob A. Saffir,
By Bennett H. Leverson.
Attorney Patented June 7, 1949

2,472,492

UNITED STATES PATENT OFFICE 2,472,492

CAST OR MOLDED DENTURE

Jacob A. Saffir, Kew Gardens, N. Y., assignor to The Dentists' Supply Company of New York, New York, N. Y., a corporation of New York Application January 30, 1945, Serial No. 575,291

7 Claims. (Cl. 18—55.1)

This invention relates to the art of dental prosthesis. More particularly, it pertains to dentures adapted to facilitate the appropriate coordination and orientation of the teeth comprising the same in order to permit effective harmonization. In its preferred adaptation, the invention applies to cast or molded dentures, and embraces among its features, novelty of structure and method of production.

Pursuant to the usual practice in the art, dentures are fabricated with the teeth thereof in permanent attachment to the plate. Illustrative is the plate which has been cast from a thermosetting resin with the teeth in situ, and upon curing of the formed denture, the teeth become permanently affixed. Similarly, the molding of a vulcanite denture in accordance with prevailing methods results in a permanent association of the teeth upon vulcanization of the plate. Differentiated from such cast or molded dentures are bridgework devices wherein a porcelain tooth or teeth may be removably attached through the expedient of a positive mechanical jointure means, and such structures are entirely outside the sphere of the present invention.

The term "molding" as utilized in the present application is intended to be generic to the casting of a denture from a material in the fluid state as well as to forming a denture from a material in the plastic state. Similarly the denture or other article is generically defined herein as "molded," irrespective of whether it results from casting from a substance in the fluid state or forming the article from the gelled or plastic state of the substance utilized.

It has been known that the heat treatment requisite to the curing or vulcanization of cast or molded dentures develops stresses by virtue of the difference in coefficient of expansion or contraction as between the investment composition, such as plaster of Paris, or Keene's cement, containing a finely divided heat conducting metal, and the resin or plastic contemplated for the denture. These stresses may result in teeth breakage as well as other irregularities.

Attempts have been made to obviate this situation by coating the denture teeth with a resilient or yieldable veneer to compensate for the aforesaid differential in the coefficient of expansion or contraction between the types of materials present during the casting or molding operation. This concept, however, has clearly contemplated the permanent retention of the teeth in the denture as a result of the molding operation. No means or expedient has been indicated or afforded for the adjustment of such teeth or dentures, as will be apparent from their fundamental purpose, and corresponding design for retention by the plate.

Additional irregularities attributable either to personal error or inherent difficulties involved in the method of casting or molding are illustrated by denture warpage, improper occlusal harmonization, teeth breakage, color discrepancies of the teeth, and so forth. Attempts to overcome problems of this sort have necessitated such expedients as discarding the denture or resorting to undesirable alteration of the predetermined tooth anatomy, as by laborious grinding of the occlusal surface, or the like.

It is an object of my invention to obviate such difficulties and uncertainties as hereinabove described.

Another object is to provide a cast or molded denture which expediently lends itself to adjustment, and substantially minimizes losses inherently or otherwise attributable to the details of the operation embraced in its production.

An additional object is to obtain a denture having the teeth thereof coordinated with the plate and adapted for replacement, or adjustment without impairing their anatomic characteristics.

An important object of the invention is a denture cast or molded from a synthetic resin or plastic material with the teeth thereof in situ, said teeth being essentially removable from the denture plate for purposes of adjustment, alteration or replacement.

A significant object is the production of a molded or cast denture plate derived from a synthetic resin or plastic composition, and having teeth sockets formed therein during the molding or casting process, the sockets being adapted for seating the gingival portion of predetermined teeth in a coordinated fit.

A further object is to devise a method for casting or molding dentures with the teeth in situ during the casting or molding operation and removable from the denture upon completion of the casting or molding operation.

Other objects, advantages, and features of my invention will become apparent from the following description read in connection with the accompanying drawings in which similar elements are designated by like numerals.

Fig. 1 is a fragmentary sectional elevation showing a portion of an upper plate of wax with a tooth in situ, the denture being imbedded in the investment composition of a two-part molding flask not shown.

Fig. 2 presents a similar cross sectional view, the wax impression of the jaw having been eliminated from the mold.

Fig. 3 indicates an analogous fragmentary sectional view, with the resin or plastic composition from which the plate is fabricated replacing the wax which determined the initial denture.

Fig. 4 pertains to an elevational showing of the denture portion formed pursuant to the indication of Fig. 3, when the denture is removed from the investment composition, the tooth being seated in the plate.

Fig. 5 shows a fragmentary elevational view of an upper denture after the synthetic resin or similar material from which the plate is molded or cast, has been set or cured, illustrating defective harmonization relative to corresponding lower teeth.

Fig. 6 comprises an elevation similar to that shown in Fig. 5 with the completed upper denture adjusted to appropriate intercusping with the corresponding lower teeth, the teeth of the upper denture being fixed in their upper sockets.

Fig. 7 is directed to the cured or set upper denture, as indicated in Fig. 5, with two of the teeth out of their respective sockets.

Within the scope of my invention it has been found that an essentially finished efficient denture may be expediently attained with the teeth thereof removable, despite the molding or casting of the denture plate with the teeth in situ pursuant to the usual practice which ordinarily results in a permanent attachment of the teeth. Differently stated, the dentures are molded or cast with the teeth thereof positioned to determine their respective sockets, but in contravention to the characteristics of the conventional cast or molded denture, the teeth are removable from their sockets. It is to be understood that the cast or molded dentures herein refers to the essentially completed article, and do not contemplate dentures of temporary significance, as illustrated by wax plates or the like. In their preferred adaptation, they refer to plates of synthetic resin, as well as to teeth derived from a plastic composition or resin.

Various expedients may be restorted to for providing dentures manifesting the requisites of the present invention. These expedients include details of tooth design, resort to extraneous devices or substances, and a recognition of the respective properties of the materials from which the teeth and the plate are fabricated.

Contrary to the conventional practice in the art involving resort to positive mechanical means or devices, including such details as undercuts, retaining shoulders and the like, to provide a reliable attachment between tooth and plate, the present invention is predicated upon avoiding any such positive device and minimizing any tendency toward an attachment during the course of the denture production.

Thus, considering primarily the abstract characteristics of the materials, porcelain teeth do not manifest any particular propensity for attachment to plates derived from a plastic composition, such as a synthetic resin or vulcanite, or even to metal plates. Similarly no special proneness to attachment is indicated between metal or thermoset resinous teeth on the one hand and denture plates of thermoset resins on the other hand, or vice versa. The same absence of any particular inclination for attachment generally prevails between thermoplastic and thermoset resins, where the teeth are made of one material and the plate from the other. It is to be understood that the foregoing considerations are presented as a generalized indication and are not to be construed as limiting either as to the propensity of attachment to each other between respective types of materials or the degree of attachment which may be involved.

Distinguishing from the above types of materials, are any substances utilized for the teeth and denture plate which are adapted to copolymerize or interfuse, during the course of the molding or casting of the denture, as well as the subsequent curing or heat treatment. Generally indicative of this category is the situation where both the teeth and the plate are derived from synthetic thermoplastic resins. While the association of thermoset resins and thermoplastic resins may not as a general matter tend to become fixedly attached to each other under conditions pertaining to denture fabrication, the contrary may apply, and as a matter of precaution, within the purview of the invention, it is usually desirable to resort to an extraneous device or substance to definitely prevent any such attachment between teeth and plate as a result of the molding or casting procedure.

In brief, the fundamentals of the invention are predicated upon such structural features or material characteristics as will reduce to a substantial minimum the tendency toward adhesion or interfusion between the teeth and the denture plate during the heat treating stages involved in the molding or casting of the denture and curing or vulcanizing the same.

Referring more particularly to the features of the invention as indicated by the various figures of the drawing which are to be taken as illustrative and not limiting, 1 and 2 designate the investment composition in the component parts of a molding or casting flask which is similar to conventional devices of this type. A wax model of an upper jaw impression corresponding with a denture plate is indicated as 3, while 4 represents a tooth of the denture. Any usual investment composition 5 may be utilized, and the denture comprising the wax plate 3 and the tooth 4 is embedded as shown, pursuant to normal procedure.

The tooth 4 of Figs. 1–4 is of the posterior type with 6 the gingival or root portion thereof and 7 the occlusal end thereof. The illustrative showing of a posterior type of tooth having an occlusal surface represents a particularly expedient adaptation of the invention, in view of the desirability of avoiding damage to the anatomy of this type of tooth. The invention, however, is clearly of a scope which embraces any type of tooth contemplated for denture construction.

It will be noted that the root or gingival end 6 is rounded in a manner to minimize any retentivity between the tooth and plate. Intervening between the gingival end 6 and the plate 3 there is shown a separator material 8. Whether or not this separator material is essential will be determined by the inherent characteristics of the material from which the tooth 4 and the final denture plate are fabricated. As previously indicated, these characteristics are primarily dependent upon the mutual cohesive properties of the teeth and the denture plate and/or the tendency of the teeth and plate to copolymerize or interfuse as a result of the heat treatment involved in the molding or casting operation, or by virtue of the subsequent curing treatment.

The material utilizable as separator means 8 may be any substance which is essentially inert relative to the material from which the plate is molded or from which the tooth is made even at the maximum temperatures encountered under molding, casting, or curing conditions. Indicative of such materials are non-toxic metallic foils, such as tin or aluminum foil and cellulosic substances, exemplified by cellophane. Similarly, compositions adapted to provide an inert, comparatively easily removable film may be resorted to; such films may desirably include those which are brittle or of a friable nature. Examples of suitable films are such as are obtainable from collodion, cellulose acetate lacquers, and various types of non-toxic varnish comprising gums or resin in a lacquer solvent adapted to provide the requisite type of film. In brief, any non-toxic separating media which will minimize cohesion, adhesion or interfusion between the tooth and the plate may be employed.

It will be apparent that, dependent upon the thickness of the separator material or film 8, a space will be provided in the completed denture between the tooth and its socket, upon removal of the separator material, which will serve for the retention of the adhesive composition, such as cement, that is to be utilized for the permanent attachment of the tooth in its socket. Thus, in the case of the metal foil separator means, laminated tin foil will serve to increase the space available for the cement dependent upon the thickness of the lamination.

The channel or cavity 9 as shown in Fig. 2, results from the elimination of the wax plate as by resort to heat to an extent which will fluidize the wax and cause it to flow from the molding device. At this stage of procedure, the tooth 4 is retained in position with respect to cavity 9 by the embedment of its occlusal end 7 in the investment composition 5 of the mold.

In accordance with Fig. 3, cavity 9 has been filled with the resin or plastic composition 10 from which the denture plate is fabricated. Thus, the plate material has in effect replaced the wax of the temporary denture shown in Fig. 1. The cured denture of Fig. 4, comprises the resin or plastic plate 11 with tooth 4 removably seated in its socket, the separator means or material 8 still enveloping the gingival portion 6 of the tooth to the extent of preventing a direct contact between the latter and the plate material. The separator means may be removed from the tooth surface and/or from the cavity in any convenient manner, such as a burnishing or grinding treatment applied to the gingival portion of the tooth removed from the socket or to the socket per se.

Further illustrative of dentures embracing the concept and structural features of the invention are Figs. 5–7. It will be seen that the upper denture plate 11 is provided with sockets 17, 18, 19 and 20 within which the respective gingival portions of teeth 13, 14, 15 and 16 are adapted for seating. In Fig. 5 the cured denture, with its removable teeth seated in their respective sockets, is shown prior to adjustments, in position relative to opposing natural teeth 22, 23, 24 and 25. The illustrative lack of harmonization is attributable to premature contact between occlusal surfaces 26, 27 of respective opposing teeth 14 and 23.

Fig. 6 pertains to the same upper denture as shown in Fig. 5, after appropriate adjustments have been made, and the denture has been suitably harmonized with respect to the aforementioned opposing natural teeth. As clearly appears from Fig. 6, the adjustments resulting in a harmonized articulation need not alter the predetermined surface anatomy of the opposing teeth. Teeth 17, 18, 19 and 20 are fixedly attached to plate 11 by a suitable retaining material, such as cement 12, in the completed harmonized denture.

The feasibility and facility of applying adjustments to dentures within the purview of the invention is emphasized by Fig. 7, wherein teeth 14, 15 are shown removed from their respective sockets 18 and 19. Socket 18' represents an enlargement of socket 18 of Fig. 5 to permit tooth 14 to seat more deeply therein.

A preferred embodiment of surface contour for the gingival or root portion 6 of tooth 4 is, as shown in the various figures of the drawing, curvilinear, and entirely free from any shoulders or retentions which would serve to inhibit the free removal of the tooth from its socket. Thus, the surface curvature in effect represents a gradual tapering from the exposed portion of the tooth to the extreme gingival or root end. However, the invention is not intended to be restricted to this particular shape. For example, the gingival or root end of the tooth may be of rectangular, cylindrical, square, or other surface design without departing from the scope of the invention, the fundamental requisite being that the gingival end of the tooth is devoid of a wall or contour surfaces which flares into the socket or which provides any form of projections, or shoulders or other means designed to function as a retention device.

Illustrative of an expedient method for forming dentures within the scope of the present invention, a wax plate 3, corresponding with the impression of the jaw, is first obtained. The teeth to be utilized in the denture, entirely free from any retention means or characteristics, and having their gingival or root portion designed to minimize retention by the plate, are desirably provided with a separator means or material. A preferred embodiment of separator is laminated tin foil of a thickness to provide space in the ultimate socket of the final denture adapted to retain adhesive composition such as cement. While, as previously noted, the resort to a separator may not be altogether essential with certain materials comprising the teeth and the plate, its use is a preferable expedient in most cases and in any case functions as a precautionary device against premature attachment of the teeth to the plate. In the following consideration, it will be understood that tooth 4 is indicative of any predetermined number of teeth contemplated for the denture.

With the gingival portion of tooth 4 desirably provided with separator means 8, the tooth is seated in wax plate 3. The denture model of Fig. 1 is then positioned in the investment composition 5 of the molding flask, as shown in Fig. 1 in accordance with the usual practice. Sufficient heat is then applied to the flask to fluidize the wax plate 3 and to permit this molten wax to be eliminated from the mold, thereby creating a channel or cavity 9, pursuant to Fig. 2. The tooth 4, at this stage of procedure, is retained in position with respect to cavity 9, by the embedment of its articulating end 7, which is an occlusal surface as shown, in the investment composition 5.

The requisite application of heat may be attained in any expedient manner, such as by the enclosure of the mold flask in an appropriate zone of heat treatment, such as an oven. Preferably, the wax is fluidized and removed by resort to hot water.

Prior to the introduction of the resin or other plastic composition from which the plate is to be molded, the cavity 9 is desirably rendered fluid impervious by coating the walls thereof with a suitable material adapted to fill the pores of the cavity walls, thereby avoiding any undue variation in the denture mold or cast as a result of seepage of the resin or similar material into the investment composition. Among the types of substances which may be resorted to for coating the cavity walls are alginate, a varnish solution, a rubber composition, and in brief, any material adapted to provide a substantially fluid impervious surface, and which is essentially inert with respect to both the investment composition and the resin.

The coating of the cavity walls may be accomplished in any expedient manner which will permit the coating material to come into contact with the entire wall surface. Thus, the coating material may be supplied to cavity 9 to the extent of filling the same, and then, after the wall surface has been more or less impregnated, causing the excess material over that necessary for coating purposes, to flow out. After a comparatively brief time interval for drying, dependent upon the characteristics of the coating material, the cavity is in condition for the molding or casting composition. In lieu of this type of coating, a metal foil, such as tin or aluminum foil, may be placed over the cavity surface to prevent seepage of resin into the wall pores.

With the elimination of wax plate 3, cavity 9 is appropriately filled with the synthetic resinous material or plastic composition 10 from which the denture plate is to be fabricated. The synthetic resin may be in a plastic state or in a fluid state, dependent upon its characteristics, and the manner of introducing the resin into the mold will be governed by these characteristics in accordance with the usual practice for molding or casting operations.

Upon filling cavity 9 with the resinous material 10, the separator means 8 of tooth 4 comes into intimate contact with said resinous material determining the denture plate, and at the same time prevents a contact between the tooth and the resinous material. The denture material 10 in cavity 9 is then subjected to a vulcanizing or curing treatment, dependent upon the nature of this material, by heating under predetermined temperature conditions.

Upon termination of this curing or other heat treatment, the denture 11 is essentially completed and is removed from the molding flask, after appropriate cooling, in any expedient manner. The tooth 4 is removable from its socket with little effort, and the separator means or material 8 is desirably eliminated from the gingival portion of the tooth and/or from the socket by appropriate grinding or burnishing treatment.

As previously indicated, adjustments to the tooth are desirably applied by alteration of the gingival portion of the tooth or by variation of its socket. Subsequent to the application of requisite adjustments, the tooth is seated in its cavity either temporarily or permanently by resort to an appropriate adhesive composition, such as a dental cement. As an aid to the effective retention of the tooth in its socket, its gingival end may be suitably roughened; alternatively, openings or crevices may be ground or drilled in the gingival end to permit the adhesive or cementitious material in the socket to pass into and fill them. For permanent attachment where the teeth and the plate are amenable to interfusion, this mode of attachment is also available.

Indicative of desirable materials which may be utilized for the denture plate and the teeth, the former may effectively be a phenol-formaldehyde type resin, such as Bakelite or Condensite (see Chemical and Metallurgical Engineering, vol. 41, 1934, pages 589 to 591 inclusive), while the latter is of porcelain derivation. An effective combination of materials is also exemplified by a thermosetting resin, such as Condensite, for the plate and an acrylic resin for the teeth, which is thermoplastic. This latter combination is of interest in view of the fact that a tooth of acrylic resin does not manifest a pronounced tendency to cohesion or attachment to a Condensite plate, although as a practical expedient, it is generally desirable to include a separator means between the teeth of this type and the Condensite plate.

In the case of thermoplastic resins for both the teeth and plate, a desirable combination comprises acrylic teeth with a denture base also of an acrylic resin. In this embodiment, a separator means or substance is requisite in view of the tendency of the teeth and plate to interfuse at curing temperatures. Desirably, the separator means is a metallic foil, such as tin foil or aluminum foil, and, as previously noted, the foil is preferably laminated to a thickness sufficient to provide a space between the tooth and its socket, which space is adapted for receiving an adhesive composition.

A further example of this type involves the use of an acrylic resin for either the teeth or the plate with styrene comprising the complementary structure; that is, with acrylic teeth, the plate is of styrene, and with an acrylic plate, the teeth are of styrene. Similarly, the combination of a vinyl resin plate with acrylic teeth, or vice versa, is effectively utilized within the scope of the invention, with a separator means between the teeth and the plate during the molding and curing operation.

Desirable embodiments illustrative of resins adapted for casting are the "Allymer" monomers disclosed for denture fabrication in my copending application Ser. No. 556,830, and particularly the optimum modification described therein comprising the glass fiber-Allymer monomer compositions, especially those involving Allymer-monomer No. 149. These resins, which in their monomeric state are commercially identified under the trade-name "Allymer," are essentially linear chain type organic esters having two terminal allyl radicals. The chemical characteristics of the Allymer monomers are illustrated by the patent to Irving E. Muskat No. 2,370,565 and the patent to Franklin Strain No. 2,397,631. Said monomer No. 149 is characterized as bis [N-(carballyloxy) aminoethyl] carbonate by the latter disclosure. While this type of resin in its ultimate cured stage manifests thermostat characteristics, the use of a separator means, such as metal foil, is a desirable expedient in adapting this type of resin composition to the present invention.

The optimum embodiments of the present invention are directed to dentures derived from plastic compositions and particularly those of synthetic resinous derivation. It is, however, not intended to be restricted to this type of material, since various features of the invention may be attained from other types of material adapted for dental prosthesis, such as metals.

Illustrative of many adaptations of the invention is that of obviating warpage. This comprises an extremely significant problem in the art because of the substantial tendency towards this defect as a result of the molding or casting operation, particularly during the curing or setting stages of plastic compositions, and especially synthetic resins or the like. Indicative of this problem and its solution, Figs. 5–7 are of interest.

As shown by the upper denture of Fig. 5, tooth 14 has risen in its socket, and the resultant projection serves to prevent an appropriate harmonization of the teeth 13, 14, 15 and 16 of this denture with the corresponding articulating surfaces of the opposing natural teeth 22, 23, 24 and 25. This difficulty may be obviated without the necessity, pursuant to the present practice in the art, of altering the surface anatomy of tooth 14 and possibly tooth 23. By virtue of the present invention, the abnormal projection of tooth 14 may be remedied by altering the gingival or root portion of that tooth; or conversely the socket 18 of the tooth 14 may be enlarged. The desired extent of alteration may be attained through grinding or burnishing of the gingival or root portion or socket until tooth 14 assumes a sufficiently lower seat in socket 18 to permit a harmonization of the opposing articulating surfaces in accordance with the showing of Fig. 6. It will be noted that socket 18' in Figs. 6, 7 represents a deepening of socket 18 to the extent necessary for the desired harmonization.

Having provided the requisite adjustment, primarily through the gingival portion of the removable tooth 14 or its socket, the teeth of the denture 11 are then subject to attachment in their respective sockets in any expedient manner. Thus, the teeth may be permanently fixed in their sockets by any appropriate dental cementing composition. Illustrative of a desirable cement is "Cycleweld," which is particularly effective for bonding plastics, as exemplified by attaching teeth to a denture plate where both are of synthetic resinous derivation. The chemical characteristics of "Cycleweld" are indicated in the patent to Seymour G. Saunders and Harry Morrison No. 2,376,854, the general characteristics of this type of composition comprising a mixture of synthetic rubber selected from the group consisting of chloroprene polymers and butadiene acrylic nitrile polymers with an adhesive consisting essentially of a thermo-setting synthetic resin and a volatile organic solvent for said resin, the mixture being represented as a dispersion of discrete particles of the synthetic rubber in a continuous phase of said resin in solution in said solvent. This cement may be applied in any expedient manner, as by brushing, to the area at which attachment is contemplated; desirably heat and pressure is resorted to for attaining the requisite bonding of the teeth in their respective sockets. As a preliminary to the cementing attachment of the teeth to the plate, the gingival ends may be desirably roughened, or even provided with such devices as traps, crevices, or other surface irregularities, as by drilling or grinding. Similarly, minature traps or the like may be supplied to the teeth sockets in order to permit the cementitious material to provide a sort of locking engagement between the sockets and their teeth. In lieu of a permanent attachment, the adhesive composition may be such as to afford merely temporary retention of the teeth. This will be apparent from following considerations.

Another significant adaptation of the invention is its amenability to permitting a patient to become accustomed to a given denture during an interval of gradual adjustment to the denture. While a denture designed for a "short bite" involves considerably less of an ordeal on a patient during the interval of becoming accustomed thereto, the dictates of efficiency and aesthetics are for a comparatively "long bite." In accordance with the former practice, a change of this sort necessarily involves the inconvenience of becoming accustomed to two different dentures, including the palatal portion, as well as embracing a dual expense. Morover, a gradual increase in the bite is not possible from a practical angle.

Pursuant to the present invention, comparatively shorter teeth may be fitted to the denture and retained in their respective sockets through use of a temporary cement, illustrated by zinc oxyphosphate cement, or by an amyl acetate type of cement, that is a cement essentially soluble in amyl acetate. These cements afford a retention of the teeth in their sockets for a reasonable interval of time, and permit a change of the teeth at predetermined intervals until the patient has had opportunity to become gradually accustomed to teeth of the desired length. The replacement of the teeth during the interval of passing from the "short bite" to the "long bite" is facilitated by dissolving the cement utilized through an appropriate solvent therefor. In the case of amyl acetate type of cement, various organic solvents may be utilized, such as amyl acetate; with the zinc oxyphosphate cement, dilute hydrochloric manifests the requisite solvent action without any deleterious effect on the teeth or the denture. The final teeth, manifesting the requisite length and aesthetic value, may then be subject to permanent attachment in accordance with the foregoing description.

Representing a further adaptation of the invention, the number of teeth in a given plate may be subject to gradual increase in order to facilitate becoming accustomed thereto. Thus, a comparatively few teeth of the predetermined number may be positioned in their respective sockets, with the other sockets temporarily filled with wax. As desired, the wax filling of the sockets may be removed to permit the gradual addition of teeth in the denture until the predetermined number has been attained.

Despite the care which may be resorted to during the interval of fitting teeth, dentures attainable through present practices frequently require further adjustment, possibly because of the personal element of the patient, as through nervousness or misunderstanding. In lieu of the former necessity, in many instances, of discarding defective dentures of this sort or extensively remodeling them by arduous work, the present invention lends itself to a simple adjustment of most, if not all, defects through the expedient of repositioning and/or realigning the teeth by alteration of the teeth and/or their sockets.

A particularly valuable feature of the invention resides in the feasibility of providing in situ the ultimate position of the teeth for a given denture. Having made the necessary adjustments of teeth or denture, desirably without altering the predetermined surface anatomy of the teeth, and having ascertained that the teeth are properly aligned, correctly articulated, and of appropriate size, shape, and color, the respective sockets are supplied with dental cement of a predetermined type, and the gingival ends of the teeth are placed in the cement. The patient is then caused to manifest a biting action relative to opposing teeth. The result is the appropriate positioning of the teeth in harmonization with opposing teeth and in generally proper correlation and alignment. Thus, the teeth will be set up correctly for the mouth per se as well as for the articulator.

It will be apparent from the foregoing that requisite adjustments may involve alteration of the teeth sockets independently of the gingival portion of the respective teeth fitted thereto during the molding or casting operation, or the changes of the socket may be supplementary to any variation applied to the gingival portion of the respective teeth. Moreover, while the adaptations of the invention have been primarily considered from the standpoint of cementing the teeth into their sockets, this is not to be taken as in any sense precluding the interfusion of plastic teeth and base for the ultimate attachment, where the circumstances expediently permit the same.

Where a replacement of one or more teeth is contemplated for any reason, such as that of tooth breakage or discrepancy of tooth color and shade, it is merely necessary to discard the objectionable teeth and correct the situation by new teeth shaped to correspond with those discarded, and desirably having a gingival end which is adapted to coordinate with the sockets of the respective discarded teeth.

Similarly, if the denture becomes excessively defective during the course of its production, such as during the curing stage, without resulting in any damage to the teeth, the latter may again be utilized in any desired manner. For example, if the denture model cracks, the base material may be substantially damaged or may result in an improper fit, to an extent which renders its repair quite impracticable. Under these circumstances, the teeth may be removed for use in a different denture plate, or as otherwise determined. The ability to salvage the teeth in accordance with the present invention is quite contrary to the situation with prior art dentures, in which latter case, the teeth are either lost as part of the defective denture or may be reclaimed only as a result of considerable work and time requirement, and then the reclaimed teeth are frequently in a damaged condition.

If, after a denture has been completed, an alignment of the teeth is desirable, both for the purposes of appropriate harmonization and aesthetic value, this may be accomplished with substantial facility as a result of the removable character and shiftable propensity or replacement of the teeth.

The denture of the present invention accordingly provides the advantages of a fitted cordination of removable teeth and plate or base, through the expedient of molding the latter with respect to the teeth and thereby attaining a fitted tooth socket. Any adjustment applicable to the denture may be in substantial measure accomplished by altering or correcting the gingival or root portion of the denture tooth. In this manner, the predetermined anatomical characteristics of the teeth, such as their articulating surfaces, may be retained without substantial variation, even though adjustments may be necessary to obtain appropriate harmonization.

It will be apparent that the adaptations of the various modifications and/or ramifications within the purview of the invention lend themselves to an efficient denture which is subject to production in an expedient manner, and is susceptible to a facilitated adjustment for obviating such defects as warpage, teeth breakage, teeth color or shade discrepancy, improper alignment, size or shape, and incorrect articulation, or the like. At the same time, any necessity for altering the predetermined desirable anatomic characteristics of the denture teeth, such as occlusal surfaces, is substantially obviated.

While I have described my invention in accordance with desirable embodiments it is obvious that many changes and modifications may be made in the details of construction and in the combination and arrangement of parts, without departing from the spirit of the invention as defined in the following claims.

Having thus set forth my invention, I claim:

1. The method of making a plastic denture which comprises molding the denture plate with the teeth in situ in the mold, the gingival portion of said teeth being provided with means for preventing direct contact of said teeth with the molding material and permitting removal of said teeth, said teeth uniformly converging toward their gingival end portion into the denture plate material, curing the said plastic material, and removing said teeth, whereby a cured plastic denture plate having formed teeth-receiving sockets is attained.

2. The method of making a denture which comprises molding a synthetic resinous plate with predetermined teeth in situ, said teeth provided with a metal foil separator means enveloping their gingival portion to prevent direct contact with the resinous material, curing said plate, removing said teeth, adjusting said denture by alterations of the gingival portions of the teeth and sockets to provide appropriate positioning, alignment and harmonization and fixedly attaching said teeth to said plate in their respective sockets.

3. The method as in claim 2, wherein the plate and teeth are of synthetic resinous material and adapted for an interfused attachment after adjustment of the denture.

4. The method as in claim 2, wherein the teeth are cemented in the socket for attachment to the denture after adjustment of the denture.

5. The method of making a harmonized denture which comprises molding a denture plate from a plastic composition with predetermined teeth in situ, the gingival portion of said teeth being provided with means for avoiding direct contact with the said plate and permitting removal therefrom, curing said denture plate, removing said teeth from said plate, altering the gingival portion or sockets of said teeth for providing adjustments in said denture, and fixedly attaching said teeth to their respective sockets.

6. The method as in claim 5, wherein the teeth are attached to the plate by cement, and are harmonized in situ relative to opposing teeth by causing a biting contact on the denture teeth in their respective sockets containing the cement, prior to its setting.

7. The method as in claim 5, wherein the means for avoiding direct contact of the gingival portions of the teeth with the plate comprises a friable film-forming composition.

JACOB A. SAFFIR.

REFERENCES CITED

The following references are of record in the file of this patent:

UNITED STATES PATENTS

| Number | Name | Date |
|---|---|---|
| 831,960 | Lesemann et al. | Sept. 25, 1906 |
| 1,219,019 | Magnus | Mar. 13, 1917 |
| 1,742,430 | Wardell | Jan. 7, 1930 |
| 2,279,067 | Shapiro | Apr. 7, 1942 |
| 2,295,864 | Prange | Sept. 15, 1942 |
| 2,341,156 | Myerson | Feb. 8, 1944 |
| 2,367,767 | Gale | Jan. 23, 1945 |